United States Patent [19]

Kachi et al.

[11] Patent Number: 4,743,745
[45] Date of Patent: May 10, 1988

[54] OPTICAL MEMORY CARD READER

[75] Inventors: Kenjiro Kachi, Tsurugashima; Tetsuya Honda, Shiki, both of Japan

[73] Assignee: Kabushiki Kaisha Nippon Coinco, Tokyo, Japan

[21] Appl. No.: 937,066

[22] Filed: Dec. 2, 1986

[30] Foreign Application Priority Data

Dec. 5, 1985 [JP] Japan ............................ 60-187579[U]

[51] Int. Cl.$^4$ ............................................. G06K 13/00
[52] U.S. Cl. ..................................... 235/482; 235/483; 235/454
[58] Field of Search ......................... 235/482, 454, 483

[56] References Cited

U.S. PATENT DOCUMENTS 4,441,018  4/1984  Wessel ................................. 235/482

Primary Examiner—Harold I. Pitts
Attorney, Agent, or Firm—Koda and Androlia

[57] ABSTRACT

In an optical memory card reading device of the type comprising a card feeding means for feeding a card inserted into an insertion inlet into the device, an optical reader means for illuminating the memory surface of the optical memory card thus fed in and receiving the reflected light rays from the memory surface and a circuit for converting the information read out by the optical reader means into an electric signal which in turn is analyzed to detect the contents in the memory, an optical memory card reading device characterized by the provision of a card cleaning means which is disposed adjacent to the card insertion inlet for cleaning the memory of the inserted card.

5 Claims, 2 Drawing Sheets

OPTICAL MEMORY CARD READER

BACKGROUND OF THE INVENTION

The present invention relates to an improvement of an optical memory card reader.

In the prior art optical memory card readers, light illuminates the memory surface of a card and the reflected light is received by a light receiving element which in turn converts the quantity of received reflected light into an electrical signal which in turn is analyzed to read the contents of the memory card.

However, such optical memory card readers of the type described above have a common defect that when the memory cards are contaminated, it becomes impossible to read out the contents in the memory.

As the result, the users must keep the optical memory cards clean or when the optical memory cards are used, their memory surfaces must be cleaned. Therefore this is one of the reasons why the use of optical memory cards has not been extensively used even though they have a large information storage capacity.

SUMMARY OF THE INVENTION

The primary object of the present invention is therefore to eliminate the above and other defects encountered in the prior art optical memory card readers.

To the above and other ends, in an optical memory card reading device of the type comprising a card feeding means for feeding a card which is inserted into an insertion inlet into the device, an optical reader for illuminating the memory surface of the optical memory card thus fed into the device with light rays and receiving the reflected light rays from the memory surface by a light receiving element and a circuit for converting information readout by said optical reader into electrical signals which in turn are analyzed to detects the contents of the optical memory card, the present invention is characterized by the provision of a card cleaning means disposed adjacent to the card insertion inlet for cleaning the memory surfaces of optical memory cards.

When an optical memory card is inserted, the card feeding means and the card cleaning means are energized so that an inserted card is cleaned by the card cleaning means and is fed into the reading device in an optimum state to be read out.

DESCRIPTION OF THE PREFERRED EMBODIMENTS

Figure 1:
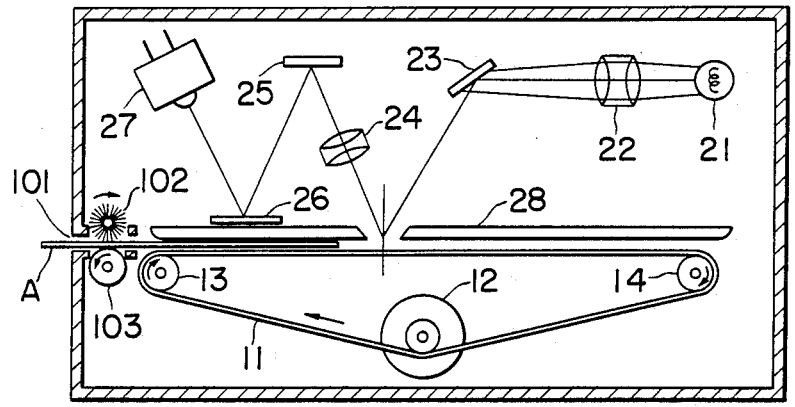
FIG. 1 is a longitudinal sectional view of a preferred embodiment of the present invention.

FIG. 1 shows a first preferred embodiment of the present invention which provides a card cleaning means in a prior art optical memory card reading device comprising a card feeding means for feeding an inserted card to a readout position and a reading means for reading out information stored on the card.

The card feeding means comprises a belt 11 passing over a driving pulley 12 and guide pulleys 13 and 14 so that a card A is displaced from the left to the right at the readout position defined between the guide pulleys 13 and 14.

The reading means comprises a light source 21, registers 22 and 24, reflecting mirrors 23, 25 and 26, a light receiving element 27 and a cover 28, whereby optical information read out at the readout position in the card feeding means is converted into an electrical signal.

A first embodiment of a card cleaning means in accordance with the present invention is disposed at a card receiving inlet 101 of the card feeding means and comprises a rotary brush 102 and a pinch roller 103. The rotary brush 102 comprises a roller to which are fixed a large number of felt-like strips made of a material which is so soft that it will not damage the card surfaces and is made into light contact with the storage surface of the card A, thereby accomplishing dry cleaning thereof. In this case, it is preferable to rotate the rotary brush 102 in the direction opposite to the direction in which the card A is transported by the card feeding means so that satisfactory dry cleaning effects can be attained. The pinch roller 103 is provided to attain better effects.

Figure 2A:
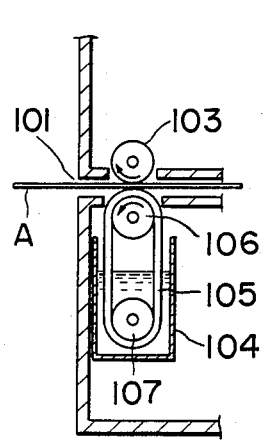
FIGS. 2(a) and (b) are sectional views illustrating the major component parts of other preferred embodiments, respectively, of the present invention.
Figure 2B:
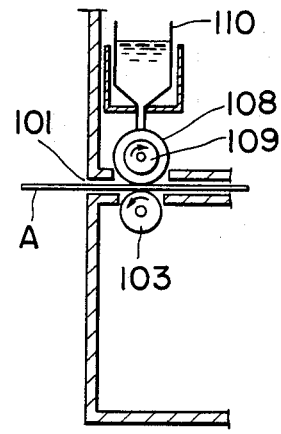

FIGS. 2(a) and (b) show further preferred embodiments, respectively, of the present invention and illustrate only the major component parts thereof. In the embodiment shown in FIG. 2(a), instead of the rotary brush 102 described above with reference to FIG. 1, a cleaning liquid container 104, a cleaning-liquid feed belt 105 and pulleys 106 and 107 for driving the belt 105 are provided. The cleaning liquid carried by the belt 105 is applied to the undersurface of the card A while simultaneously the belt 105 cleans the same. In the embodiment shown in FIG. 2(b), the upper surface of the card A is cleaned in a manner substantially similar to that described above with reference to FIG. 2(a). It comprises a roller wrapped with a belt 108 impregnated with a liquid and a funnel 110 containing a cleaning liquid.

Figure 3:
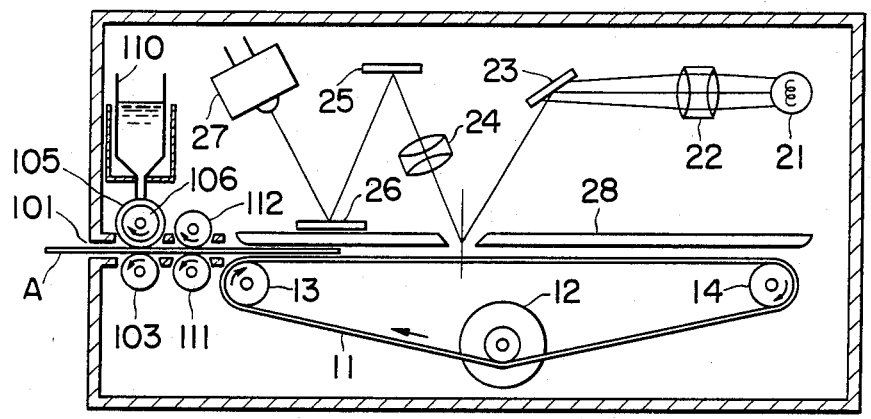
FIGS. 3 and 4 are longitudinal sectional views of further embodiments, respectively, of the present invention.
Figure 4:
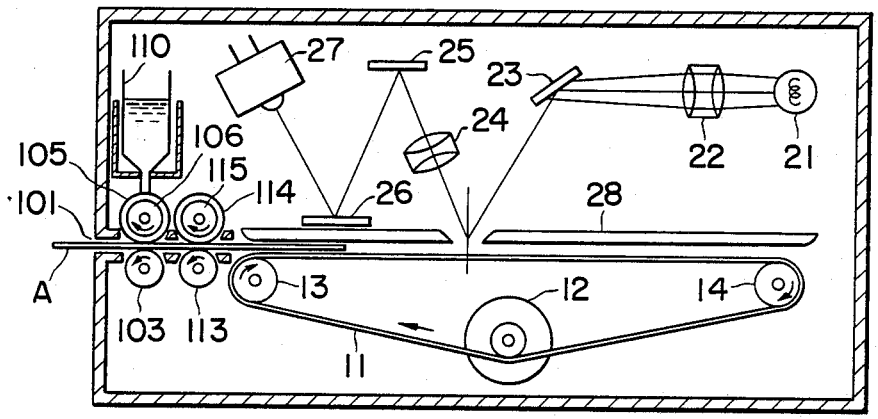

FIGS. 3 and 4 illustrate further embodiments, respectively, of the present invention. The embodiment shown in FIG. 3 has a cleaning means substantially similar in construction to that described above with reference to FIG. 2(b) except that a combination of a pinch roller 111 and a buffing wheel 112 is further added. The embodiment as shown in FIG. 4 has a cleaning means substantially similar in construction to that described above with reference to FIG. 2(b) except that a combination of a pinch roller 113 and a roller 115 wrapped with a dry wiping belt 114 is further provided. Both the embodiments shown in FIGS. 3 and 4 can attain improved cleaning effects.

The present invention may be equally applied to an optical memory card writing device.

As described above, according to the present invention, the cards with the memory surfaces maintained in the state for facilitating the readout operation are always fed into the card reading device so that erratic readout can be eliminated and adverse and detrimental effect in the case of the readout operation can be also eliminated. In addition, the present invention has an advantage that the cleaned cards are returned to the users.

What is claimed is:

1. An optical memory card reading device comprising:

card feed means for feeding a card inserted into a card insertion inlet of said device into said device;
an optical reader for illuminating the memory surface of the optical memory card thus fed with light rays and receiving the reflected light rays from the memory surface by a light receiving element;

a circuit for converting the information read out from said optical reader into an electrical signal which in turn is analyzed to detect the contents in the memory of said card; and a card cleaning means disposed adjacent to said card insertion inlet for cleaning the memory surface of said card.

2. An optical memory card reading device as set forth in claim 1 wherein said card cleaning means comprises a combination of a rotary brush and a pinch roller.

3. An optical memory card receiving device as set forth in claim 1 wherein said card cleaning means comprising a cleaning liquid container and a liquid transport belt for receiving a cleaning liquid from said cleaning liquid container and transporting it to the surface of said card.

4. An optical memory card reading device as set forth in claim 3 wherein said card cleaning means further comprises a pinch roller and a buffing wheel which are so disposed as to clamp said card.

5. An optical memory card reading device as set forth in claim 3 wherein said card cleaning means further comprises a pinch roller and a roller wrapped with a dry wiping belt which are so disposed as to clamp said card therebetween.

* * * * *